J. M. FORREST.
Seed-Planter.
No. 1,194.
Patented June 25, 1839.
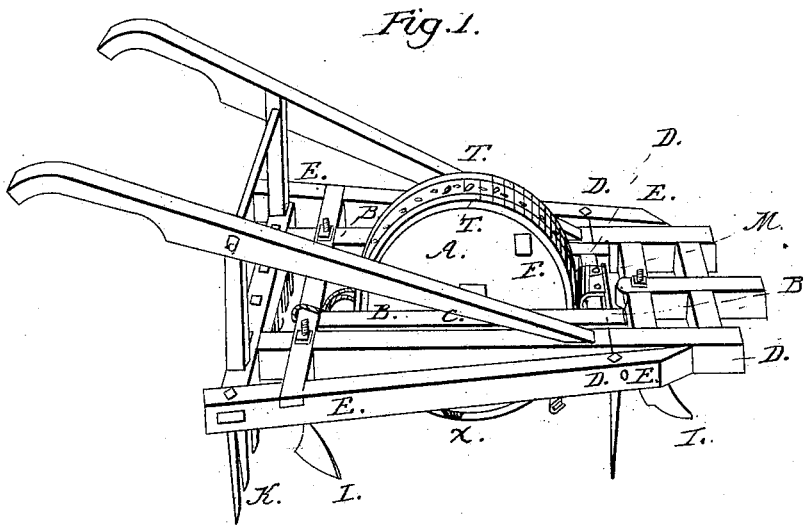

UNITED STATES PATENT OFFICE.

JOHN M. FORREST, OF PRINCESS ANNE COUNTY, VIRGINIA.

IMPROVEMENT IN PLANTING-MACHINES.

Specification forming part of Letters Patent No. 1,194, dated June 25, 1839.

*To all whom it may concern:*

Be it known that I, JOHN M. FORREST, of Princess Anne county, in the State of Virginia, have made and invented a new and Improved Corn or Grain Planter; and I do hereby declare that the following is a full and exact description.

The nature of my invention consists in a cylinder or wheel, A A, in Figure 1, designed to contain the grain, which wheel is to run upon its own face. Through the center of this wheel passes an axle, which works in a loose frame, as B B B B in Fig. 1. The axle works or turns in the moving frame, as at C in Fig. 1 and as at C in Fig. 2. The moving frame B B B B moves inside of a harrow-frame, or the main frame of the plow, E E E E in Fig. 1. The wheel, which is set or placed in an oblong frame sufficient for the purpose, may be made of any size, according to the kind of planting it is required for. The moving frame B B B B in Fig. 1, which sets inside of the main frame E E E E in Fig. 1, and which frame B B B B incloses the wheel A A, is attached at the forward part to the frame of the plow or harrow, E E E E, by an iron bolt running entirely through the whole front, as at D D in Fig. 1, so as to allow the frame which the wheel revolves in and the wheel itself to rise and fall as occasion or the unevenness of the ground may require. The wheel is hollow to contain grain, and the outer circumference is pierced with a hole, X in Fig. 2, about half an inch square, or larger or smaller according to the kind of grain or the quantity to be planted. This hole is also shown by X in Fig. 1. B B represents in Fig. 2 part of the moving frame B B B B in Fig. 1. There is a door at the side of the wheel, as at F in Figs. 1 and 2, to put the grain in. The lower part of the wheel leading to the hole X in Fig. 2 is stopped up inside to form a small segment of the circumference, as represented by letter G in Fig. 2, so as to answer as a conductor of the grain to the hole X. The hole must taper from the insides acutely to the outer edge of the rim of the wheel, as the object of this tapering is to prevent the hole from being choked up by the grain or dirt. There is a plow, as at L in Fig. 1, in advance of the wheel for opening the furrow. The wheel revolves upon its own face or rim in the furrow, and the corn or grain drops out in the necessary quantity of one or more grains, as may be desirable, the size of the hole and the guard-board regulating that. Immediately in front of the wheel and attached to a cross-bar there is a guard-board, H, Fig. 1, corresponding in form or curve with the rim of the wheel, and which hangs down with a limber or loose fit, so as to prevent too great a number of the grains from falling out at once, and which may or may not be used, as is found necessary. The edge view of this guard-board is shown by letter M in Fig. 2. About a foot behind the frame-work of the whole there is on each side a mold-board or covering-board, or palm, as at I in Fig. 1, set with the point outward, so as to turn in or close the drill which is opened by the plow in front. Immediately in the rear of this and across the frame-work, there is a set of teeth, K, No. 1, arranged as a harrow, which finishes the whole. The plow-handles are in the rear of all. If drilling by fine seed is required, the large hole X in Fig. 2, and also shown by letter X in Fig. 1, in the rim of the wheel, must be dispensed with, and small holes, as *o o o o o o o*, must be made all round the face of the wheel at reasonable and necessary distances for the grain to drop from the inside of the wheel into the furrows, and a small rim must be put on each side of the face of the wheel, so as to prevent the holes *o o o o o o o* from being stopped up by the earth. The holes *o o o* are wedge-formed from inside to out. The rims on each side of the face of the wheel are represented in Fig. 1 by letters T T.

Fig. 3 represents the manner in which this invention may be used for broad-casting, which is simply by widening the cylinder and increasing the number of holes.

What I claim as my invention, and desire to secure by Letters Patent, is—

1. The wheel containing grain or corn rolling upon its own periphery, supported by an axis set in a loose frame attached by a bolt in front to the plow or harrow frame, so as to move up and down to suit the surface of the earth it is worked upon, and dropping the corn or grain immediately in the furrow in any desired quantity.

2. The arrangement of a conductor for the grain to the place of outlet and deposit by stopping up inside a small segment of the wheel leading in a straight line to the hole which drops the grain into the furrow.

This invention may be attached to either a harrow or plow, and by widening the cylinder and increasing the number of holes may be used for broad-cast; and this invention, as thus set forth, is all that I do claim, it being distinct from the plow, harrow, mold-boards, and outer plow-frame, which I do not claim.

11th April, 1839.

J. M. FORREST.

Witnesses:
 CLEMT. T. COOTE,
 ED. TOLSON.